Dec. 17, 1940.  W. MIKELSON  2,225,348

PHASE MEASURING INSTRUMENT

Filed June 12, 1937

Inventor:
Walter Mikelson,
by Harry E. Dunham
His Attorney.

Patented Dec. 17, 1940

2,225,348

UNITED STATES PATENT OFFICE 2,225,348

PHASE MEASURING INSTRUMENT

Walter Mikelson, Ballston Lake, N. Y., assignor to General Electric Company, a corporation of New York Application June 12, 1937, Serial No. 147,932

1 Claim. (Cl. 172—245)

My invention relates to methods and apparatus for measuring phase angles.

It is an object of my invention to provide simple, rugged apparatus for measuring the phase angle between two voltages.

A further object of my invention is the provision of such apparatus for accurately measuring small phase angles.

Other and further objects and advantages will become apparent as the description proceeds.

In carrying out my invention in its preferred form I connect the two voltages, the phase angle between which is to be determined, in series opposition so that a differential voltage is produced, varying substantially in proportion to the phase angle for small phase angles. I provide a push-pull electric valve amplifier circuit with connections such that the anodes are energized by a voltage proportional to one of the voltages or the sum of the voltages to be compared and the grids are energized by a voltage corresponding to the differential voltage shifted ninety degrees. A center-zero direct-current responsive instrument is so connected in the valve circuit that its deflection is proportional to the difference in anode currents and serves as a measure of the phase angle.

Figure 1:
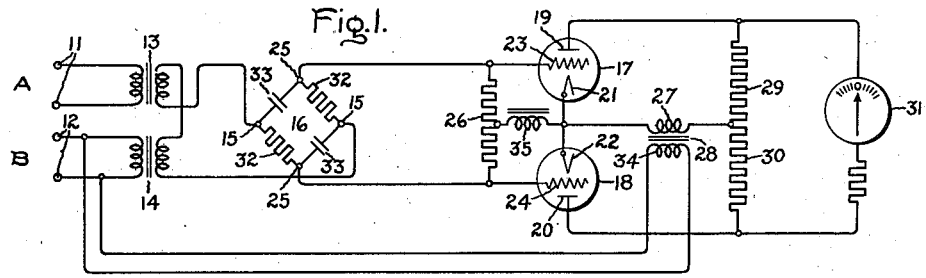

The invention may be understood more readily from the following detailed description when considered in connection with the accompanying drawing and those features of the invention which are believed to be novel and patentable will be pointed out in the claim appended hereto. In the drawing, Fig. 1 is a circuit diagram representing schematically one embodiment of my invention; Figs. 2a, 2b, 2c, and 2d are graphs representing voltages existing in various parts of the apparatus when the voltages to be compared are exactly in phase; Figs. 3a, 3b, 3c, and 3d are graphs representing voltages in the apparatus when there is a small phase difference; and Figs. 4a, 4b, 4c, and 4d are graphs corresponding to the graphs of Figs. 3a, 3b, 3c, and 3d when the phase difference is of the opposite sign.

Referring more in detail to the drawing, two voltages, the phase difference of which is to be determined, are represented by A and B. Two pairs of terminals 11 and 12 are provided to which the voltages A and B may be applied. The terminals 11 and 12 are so arranged that the voltages A and B are connected in series-opposition and are applied either directly or indirectly through transformers 13 and 14, respectively, to input terminals 15 of a phase shifter 16. A push-pull amplifier is provided, consisting of a pair of electric valves or discharge tubes 17 and 18, which may be of any suitable type, such as electronic discharge devices, or more specifically, such as vacuum tubes commercially known as Pliotrons.

The tubes 17 and 18 consist of envelopes containing anodes 19 and 20, cathodes 21 and 22, and control electrodes 23 and 24, respectively. The control electrodes 23 and 24 are connected to output terminals 25 of the phase shifter 16. The cathodes 21 and 22 are electrically connected, and preferably a resistor 26 is provided having its midpoint connected to the cathodes 21 and 22 and its ends connected across the output terminals 25 of the phase shifter 16. A source of anode voltage, consisting of a secondary winding 27 of a transformer 28, is connected between the cathodes 21 and 22 on the one hand and the anodes 19 and 20 on the other hand so as to energize the tubes 17 and 18. Portions 29 and 30 of a resistor are connected in the anode circuits of the tubes 17 and 18 so that the potential difference across the entire resistor 29, 30 represents the difference in anode current in the tubes 17 and 18. A direct current device, preferably a center-zero current-responsive device, such as an indicating instrument 31, is connected across the ends of the resistor 29, 30.

The phase shifter 16 may be of any desired type, such as a four-armed bridge with resistors 32 constituting one pair of opposite arms and either inductive or capacitative reactances, such as condensers 33, e. g., constituting the other pair of opposite arms.

In the arrangement shown, the transformer 28 supplying the anode voltage has a primary winding 34 connected across one pair of terminals 12 so that the tubes are energized by a voltage proportional to and in phase with the voltage B. However, if desired, the terminals 12 may be connected directly to the anode circuits of the tubes 17 and 18 in place of the transformer connection shown, or the two voltages A and B may be connected in series in such a manner as to be additive in place of the transformer connection shown. It will be observed that the control-electrode or grid circuits of the tubes 17 and 18 are subjected to a voltage which represents a difference between the voltages A and B and is ninety degrees out of phase therewith, and the anode circuits of the tubes are subjected to a voltage which represents one or the other or the sum of the two voltages A and B. Since the apparatus has its primary value in accurately measuring small phase angles, substantially the same results are accomplished from energizing the anode circuits by one of the voltages A and B, by their vector sum if due allowance is made for doubling the magnitude of the voltage, or by an auxiliary voltage of suitable magnitude and of the same frequency. Furthermore, my invention is not limited to placing a phase shifter 16 in the position shown, as the desired quadrature relationship may also be obtained in some other manner as by interposing a phase shifter in the anode voltage supply circuit.

The principle of operation of the apparatus will be apparent from the following considerations. The current output of a discharge tube having its anode and grid energized by alternating voltages of the same frequency is dependent upon the magnitude of the component of grid voltage in phase with the anode voltage and is proportional thereto if the tube is worked in the proper portion of its characteristic curve. In the case of small angles the size of an angle between two radii of a circle is proportional to the chord joining the two radii, and the chord is substantially perpendicular to either radius. For the time being it will be assumed that the two original voltages, the phase relationship between which is to be determined have the same scalar value so that their vector representations may form radii of a circle. Consequently, the length of the chord, which is the vector difference between the radius vectors, represents the phase angle between the voltages.

In my vacuum tube circuit the anode voltage is a voltage in phase, substantially with either of the original voltages to be compared in phase, since the phase angle is small. The grid voltage is substantially in phase with the anode voltage (or 180° out of phase if the phase angle is negative) and proportional to the phase angle between the original voltages, because the grid voltage is proportional to and in quadrature with the vector difference between the original voltages. Consequently the anode current of the tube is proportional to the phase angle between the original voltages. By using two vacuum tubes in a push-pull connection I can obtain directional readings of either positive or negative phase angles. The relationships for cases where the two original voltages, to be compared in phase, have the same scalar value are shown diagrammatically in Figures 2a to 4d.

Figure 2A:
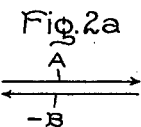

Fig. 2a is a vector diagram showing radius vectors representing the voltages A and B when they are exactly in phase, and their difference is, of course, zero since their scalar values are the same. It will later be shown that it is immaterial whether or not the scalar values are exactly the same.

Figure 2B:
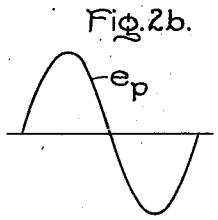
Figure 2C:
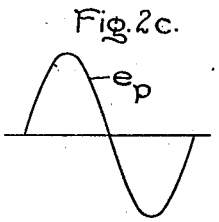

Figs. 2b and 2c are graphs showing the instantaneous values of anode voltage applied to the tubes 17 and 18, respectively, the anode voltages being represented by the symbol "$e_p$." Since, in this case, the difference between the voltages A and B is zero, the grid voltages applied to the tubes are zero and grid voltages do not appear in the graphs 2b and 2c.

Figure 2D:
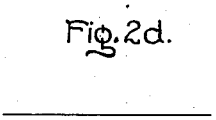

Fig. 2d is a graph representing the voltage across the ends of resistor 29, 30, which causes the instrument 31 to deflect. Since the tubes 17 and 18 are connected in push-pull, that is, in a symmetrical circuit, the difference between the plate currents is also zero for zero grid voltage and Fig. 2d appears simply as a straight horizontal line.

Figure 3A:
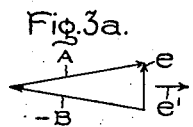
Figure 4A:
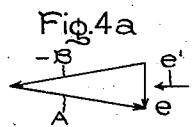

Fig. 3a is a vector diagram representing the condition when there is a small difference in phase angle between the voltages A and B and the voltage A is leading the voltage B slightly. It will be seen that the vector difference is represented by the short vector $e$ which is a chord of a circle of which the vectors A and B are radii. The voltages applied to the control electrodes 23 and 24, however, are in quadrature with the difference between the voltages A and B, and the quadrature vector $e'$ represents the voltage applied to one of the control-electrode circuits. The voltage applied to the other control-electrode circuit is, of course, of the opposite sign since the control electrodes 23 and 24 are connected to opposite ends of the resistor 26.

Figure 3B:
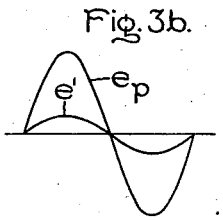
Figure 4B:
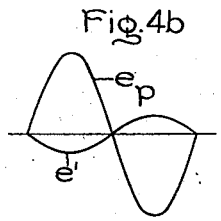

Fig. 3b represents the instantaneous values of anode voltage and grid voltage in the tube 17, the symbol "$e_p$" being the anode voltage and "$e'$" being the grid or control electrode voltage.

Figure 3C:
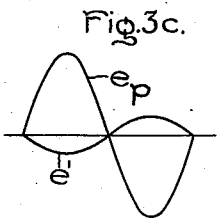
Figure 4C:
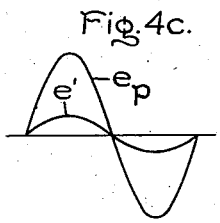

Fig. 3c represents the corresponding voltages in the tube 18. It will be seen that the anode and grid voltages have the same polarity in Fig. 3b and they have opposite polarities in Fig. 3c. Current flows in discharge tubes only when the anode voltage is positive and relatively little current flows unless the grid voltage is also positive. Accordingly, little or no anode current will flow in the tube 18 and anode current will flow in the tube 17 only during the first half of the cycle. The voltage across the ends of resistor 29, 30 which causes deflection of the instrument 31 will, therefore, be as represented by the curve E in Fig. 3d. It will be understood that the amplitude of the curve of 3d is substantially proportional to the value of the voltage $e'$ which, in turn, depends upon the difference in phase angle between voltages A and B and is proportional thereto for relatively small phase angles.

Figure 3D:
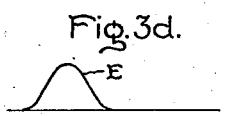
Figure 4D:
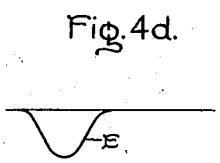

Figs. 4a, 4b, 4c, and 4d represent the conditions with a small difference in phase angle but with the voltage B leading the voltage A. In this case, the grid voltage of the tube 17 is negative during the half cycle when the anode voltage is positive, causing little or no current to flow in the tube 17, whereas the grid voltage of the tube 18 is positive during the half cycle when the anode voltage is positive, causing an increase in current in tube 18 and resulting in a negative deflection of the instrument 31. The voltage appearing across the ends of the resistor 29, 30 at this time is shown in Fig. 4d. It will be seen that the polarity in Fig. 4d is negative with respect to the polarity which exists for the opposite phase sequence, which is shown in Fig. 3d.

It will be understood that the instrument 31 is preferably one having the normal amount of inertia of deflecting instruments so that it does not follow the instantaneous values of curves 3d and 4d but its deflection represents the average value of the voltage pulsations. The magnitude of the deflection represents the magnitude of the phase difference and the direction of the deflection from the zero point of the instrument represents the sign of the phase angle.

Under certain circumstances, it may be desirable to minimize the possibility of slight inaccuracies due to differences between the tubes in their characteristics by inserting a negative grid bias. This may be done, for example, by means of an additional secondary winding 35 of the transformer 28, with connections such that the voltage in winding 35 is negative when that in the winding 27 is positive. In connection with electric power circuits in which the apparatus would ordinarily be used, the voltages A and B will be substantially the same and constant in numerical value since power circuits are operated, as nearly as possible, as constant-voltage circuits. However, should either voltage A or voltage B drop below or exceed the normal rated voltage, rotation and elongation of the vector $e$ would occur. Nevertheless, this new vector, which might be called "$e'$" is resolved into two components, one component being in phase with $e$ and being effective in producing the differential plate current measured by instrument 31, and the other component being ninety degrees out of phase and having no effect on the instrument reading since it affects the average current of both the tubes 17 and 18 equally. Consequently, the instrument reading still depends only upon the phase difference of the voltages A and B.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent in the United States is:

Apparatus substantially unresponsive to the difference in magnitude, but responsive to the size and sign of the phase angle between two alternating voltages differing relatively little in phase, said apparatus comprising a pair of electronic discharge devices, including anodes, cathodes and control electrodes, connections forming anode and control electrode circuits through said discharge devices, connections for applying the voltages, the phase angle between which is to be determined, in series opposition in one of the aforesaid circuits, means for applying in the other of the aforesaid circuits an alternating voltage of substantially the same frequency bearing a fixed phase relationship to one of the original voltages, means for shifting one of said applied voltages substantially in quadrature, and means responsive to the difference in current in said anode circuits.

WALTER MIKELSON.